(12) United States Patent
Sokol et al.

(10) Patent No.: US 8,788,096 B1
(45) Date of Patent: *Jul. 22, 2014

(54) SELF-BALANCING ROBOT HAVING A SHAFT-MOUNTED HEAD

(71) Applicant: Anybots 2.0, Inc., Santa Clara, CA (US)

(72) Inventors: John L. Sokol, San Jose, CA (US); Trevor Blackwell, Mountain View, CA (US); Scott Wiley, Los Altos, CA (US); Daniel Casner, Sunnyvale, CA (US); Benjamin Holson, Mountain View, CA (US)

(73) Assignee: Anybots 2.0, Inc., Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/669,192

(22) Filed: Nov. 5, 2012

Related U.S. Application Data

(63) Continuation-in-part of application No. 12/781,702, filed on May 17, 2010, now Pat. No. 8,306,664.

(51) Int. Cl.
*G05B 19/00* (2006.01)
*G05B 15/00* (2006.01)

(52) U.S. Cl.
USPC .......... 700/259; 700/254; 700/264; 280/298; 280/763.1; 280/766.1; 701/250; 701/254; 701/257

(58) Field of Classification Search
USPC ................. 280/293, 304, 298, 763.1, 766.1; 700/259, 245, 250, 254, 257, 264
See application file for complete search history.

(56) References Cited

U.S. PATENT DOCUMENTS

| | | |
|---|---|---|
| 3,739,252 A | 6/1973 | Hays et al. |
| 4,422,758 A | 12/1983 | Godfrey et al. |
| 4,446,412 A | 5/1984 | Friedman et al. |
| 4,620,831 A | 11/1986 | Poncet et al. |
| 4,675,502 A | 6/1987 | Haefner et al. |
| 4,693,666 A | 9/1987 | Garin |
| 4,697,472 A | 10/1987 | Hiyane |
| 4,850,041 A | 7/1989 | Roberts et al. |
| 4,859,923 A | 8/1989 | Malka et al. |
| 4,933,864 A | 6/1990 | Evans et al. |
| 4,937,759 A | 6/1990 | Vold |
| 4,985,846 A | 1/1991 | Fallon |
| 5,051,906 A | 9/1991 | Evans et al. |

(Continued)

FOREIGN PATENT DOCUMENTS

| | | |
|---|---|---|
| DE | 3825136 | 1/1990 |
| JP | 08318483 A | 12/1996 |

OTHER PUBLICATIONS

FLIR system publication on TacFlir III, 2008, FLIR Systems.

*Primary Examiner* — Toan To
(74) *Attorney, Agent, or Firm* — Peters Verny, LLP

(57) ABSTRACT

Mobile self-balancing robots for telepresence are provided. The robots comprise a base, a head, and a shaft therebetween. The shaft can be telescoping to allow the head to be extended above the base to about the height of a normal sized person, or can be retracted to make the robot more compact for easier storage and transportation. The head includes components for telepresence such as cameras, a speaker, a microphone, a laser pointer, and a display screen, as well as protection from impacts and falls. The base provides locomotion and balance, and a narrow shaft between the head and base minimizes the robot's weight and reduces the likelihood of collisions with protrusions like table edges.

16 Claims, 9 Drawing Sheets

(56) References Cited

U.S. PATENT DOCUMENTS

| | | | |
|---|---|---|---|
| 5,173,865 A | 12/1992 | Koike et al. | |
| 5,237,454 A | 8/1993 | Snyder | |
| 5,255,753 A | 10/1993 | Nishikawa et al. | |
| 5,271,292 A | 12/1993 | Sawada et al. | |
| 5,323,867 A | 6/1994 | Griffin et al. | |
| 5,341,083 A | 8/1994 | Klontz et al. | |
| 5,350,033 A | 9/1994 | Kraft | |
| 5,354,314 A | 10/1994 | Hardy et al. | |
| 5,422,828 A | 6/1995 | Choate et al. | |
| 5,426,722 A | 6/1995 | Batchelder | |
| 5,445,235 A | 8/1995 | Gormi et al. | |
| 5,467,273 A | 11/1995 | Faibish et al. | |
| 5,534,761 A | 7/1996 | Crippa | |
| 5,551,545 A | 9/1996 | Gelfman | |
| 5,562,788 A | 10/1996 | Kitson et al. | |
| 5,640,883 A | 6/1997 | Takizawa | |
| 5,673,082 A | 9/1997 | Wells et al. | |
| 5,682,795 A | 11/1997 | Solomon et al. | |
| 5,778,730 A | 7/1998 | Solomon et al. | |
| 5,903,459 A | 5/1999 | Greenwood et al. | |
| 5,929,538 A | 7/1999 | O'Sullivan et al. | |
| 5,975,225 A | 11/1999 | Kamen et al. | |
| 6,016,385 A | 1/2000 | Yee et al. | |
| 6,032,094 A | 2/2000 | Yanagi et al. | |
| 6,072,571 A | 6/2000 | Houlberg | |
| 6,084,979 A | 7/2000 | Kanade et al. | |
| 6,095,023 A | 8/2000 | Harada et al. | |
| 6,229,278 B1 | 5/2001 | Garces et al. | |
| 6,292,713 B1 | 9/2001 | Jouppi et al. | |
| 6,304,050 B1 | 10/2001 | Skaar et al. | |
| 6,324,934 B1 | 12/2001 | Monaghan | |
| 6,338,013 B1 | 1/2002 | Ruffner | |
| 6,396,961 B1 | 5/2002 | Wixson et al. | |
| 6,399,937 B1 | 6/2002 | Huang et al. | |
| 6,416,183 B1 | 7/2002 | Colpaert et al. | |
| 6,472,839 B1 | 10/2002 | Ishii et al. | |
| 6,486,568 B1 | 11/2002 | King et al. | |
| 6,526,807 B1 | 3/2003 | Doumit et al. | |
| 6,535,793 B2 | 3/2003 | Allard | |
| 6,553,271 B1 | 4/2003 | Morrell | |
| 6,580,246 B2 | 6/2003 | Jacobs | |
| 6,597,389 B2 | 7/2003 | Tanaka et al. | |
| 6,640,160 B2 * | 10/2003 | Takahashi et al. | 700/245 |
| 6,651,766 B2 | 11/2003 | Kamen et al. | |
| 6,682,020 B2 | 1/2004 | Janson | |
| 6,700,109 B2 | 3/2004 | Eckelkamp-Baker et al. | |
| 6,779,621 B2 | 8/2004 | Kamen et al. | |
| 6,795,772 B2 | 9/2004 | Lin et al. | |
| 6,799,649 B2 | 10/2004 | Kamen et al. | |
| 6,845,297 B2 | 1/2005 | Allard | |
| 6,915,878 B2 | 7/2005 | Kamen et al. | |
| 6,917,715 B2 | 7/2005 | Berstis | |
| 6,922,632 B2 | 7/2005 | Foxlin | |
| 6,925,115 B1 | 8/2005 | Andersen et al. | |
| 6,948,576 B2 | 9/2005 | Angeles | |
| 6,999,849 B2 | 2/2006 | Bridges | |
| 7,002,717 B1 | 2/2006 | Storz et al. | |
| 7,015,831 B2 | 3/2006 | Karlsson et al. | |
| 7,051,447 B2 | 5/2006 | Kikuchi et al. | |
| 7,082,350 B2 | 7/2006 | Skoog | |
| 7,130,702 B2 | 10/2006 | Morrell | |
| 7,152,882 B2 | 12/2006 | Tokumaru et al. | |
| 7,158,859 B2 * | 1/2007 | Wang et al. | 700/245 |
| 7,190,392 B1 | 3/2007 | Maguire, Jr. | |
| 7,200,482 B2 | 4/2007 | Kawarasaki | |
| 7,211,980 B1 | 5/2007 | Bruemmer et al. | |
| 7,240,747 B2 | 7/2007 | Miyazaki | |
| 7,292,912 B2 | 11/2007 | Wang et al. | |
| 7,348,747 B1 | 3/2008 | Theobold et al. | |
| 7,363,993 B2 | 4/2008 | Ishii | |
| 7,370,713 B1 | 5/2008 | Kamen | |
| 7,399,946 B2 | 7/2008 | Hertzberg et al. | |
| 7,437,202 B2 | 10/2008 | Morrell | |
| 7,481,291 B2 | 1/2009 | Nishikawa | |
| 7,481,728 B2 | 1/2009 | Pippin | |
| 7,492,115 B2 | 2/2009 | Gomi et al. | |
| 7,539,557 B2 | 5/2009 | Yamauchi | |
| 7,574,250 B2 | 8/2009 | Niemeyer | |
| 7,643,064 B1 | 1/2010 | Jouppi | |
| 7,649,331 B2 | 1/2010 | Hosoda et al. | |
| 7,654,348 B2 | 2/2010 | Ohm et al. | |
| 7,658,245 B2 | 2/2010 | Nakamura et al. | |
| 7,677,345 B2 | 3/2010 | Hosoda | |
| 7,703,568 B2 | 4/2010 | Ishii | |
| 7,719,222 B2 | 5/2010 | Theobald | |
| 7,798,264 B2 | 9/2010 | Hutcheson et al. | |
| 7,814,599 B2 | 10/2010 | Brewka | |
| D627,377 S * | 11/2010 | Wiley et al. | D15/199 |
| 7,874,386 B2 | 1/2011 | Ben-Tzvi et al. | |
| 7,891,446 B2 | 2/2011 | Couture et al. | |
| 8,036,775 B2 | 10/2011 | Matsumoto et al. | |
| 8,042,663 B1 | 10/2011 | Pack et al. | |
| 8,306,664 B1 * | 11/2012 | Wiley et al. | 700/259 |
| 2002/0006327 A1 | 1/2002 | Stuyt | |
| 2002/0033706 A1 | 3/2002 | Khazei | |
| 2002/0063006 A1 | 5/2002 | Kamen et al. | |
| 2002/0130953 A1 | 9/2002 | Riconda et al. | |
| 2002/0145102 A1 | 10/2002 | Eckelkamp-Baker et al. | |
| 2002/0146347 A1 | 10/2002 | McNeil | |
| 2003/0030399 A1 | 2/2003 | Jacobs | |
| 2003/0093187 A1 | 5/2003 | Walker | |
| 2003/0155747 A1 | 8/2003 | Bridges | |
| 2003/0227602 A1 | 12/2003 | Scarasso | |
| 2004/0015266 A1 | 1/2004 | Skoog | |
| 2004/0028258 A1 | 2/2004 | Naimark et al. | |
| 2004/0051260 A1 | 3/2004 | Oldiges | |
| 2004/0073360 A1 | 4/2004 | Foxlin | |
| 2004/0102166 A1 * | 5/2004 | Morita et al. | 455/152.1 |
| 2004/0168148 A1 | 8/2004 | Goncalves et al. | |
| 2004/0243147 A1 | 12/2004 | Lipow | |
| 2005/0150876 A1 | 7/2005 | Menin et al. | |
| 2005/0283274 A1 | 12/2005 | Kleinschmitt | |
| 2006/0076039 A1 | 4/2006 | Song et al. | |
| 2006/0093915 A1 | 5/2006 | Lundquist et al. | |
| 2006/0097683 A1 | 5/2006 | Hosoda et al. | |
| 2006/0111814 A1 | 5/2006 | Hachitani et al. | |
| 2006/0119572 A1 | 6/2006 | Lanier | |
| 2006/0223637 A1 | 10/2006 | Rosenberg | |
| 2006/0243499 A1 | 11/2006 | Hosoda | |
| 2006/0290779 A1 | 12/2006 | Reverte et al. | |
| 2006/0293787 A1 * | 12/2006 | Kanda et al. | 700/245 |
| 2007/0017855 A1 | 1/2007 | Pippin | |
| 2007/0040529 A1 | 2/2007 | Takebayashi et al. | |
| 2007/0070654 A1 | 3/2007 | Liu et al. | |
| 2007/0080147 A1 | 4/2007 | Hertzberg et al. | |
| 2007/0100498 A1 | 5/2007 | Matsumoto et al. | |
| 2007/0105070 A1 | 5/2007 | Trawick | |
| 2007/0164693 A1 | 7/2007 | King et al. | |
| 2007/0208442 A1 | 9/2007 | Perrone | |
| 2007/0229018 A1 | 10/2007 | Mitchell et al. | |
| 2008/0037306 A1 | 2/2008 | Marhefka et al. | |
| 2008/0086241 A1 | 4/2008 | Phillips et al. | |
| 2008/0105481 A1 | 5/2008 | Hutcheson et al. | |
| 2008/0136374 A1 | 6/2008 | Nelson et al. | |
| 2008/0173493 A1 | 7/2008 | Adachi | |
| 2008/0230285 A1 * | 9/2008 | Bewley et al. | 180/8.4 |
| 2008/0231233 A1 | 9/2008 | Thornton | |
| 2008/0253958 A1 | 10/2008 | McCracken et al. | |
| 2008/0265821 A1 | 10/2008 | Theobald | |
| 2009/0037033 A1 | 2/2009 | Phillips et al. | |
| 2009/0114460 A1 | 5/2009 | Amino et al. | |
| 2009/0118865 A1 * | 5/2009 | Egawa et al. | 700/259 |
| 2010/0001478 A1 | 1/2010 | De Fazio et al. | |
| 2010/0010672 A1 * | 1/2010 | Wang et al. | 700/259 |
| 2010/0222925 A1 | 9/2010 | Anezaki | |
| 2011/0015721 A1 | 1/2011 | Faul | |
| 2011/0172822 A1 * | 7/2011 | Ziegler et al. | 700/259 |
| 2011/0190930 A1 * | 8/2011 | Hanrahan et al. | 700/248 |
| 2011/0190935 A1 | 8/2011 | Hutcheson et al. | |
| 2012/0130540 A2 | 5/2012 | Stilman | |
| 2012/0215380 A1 | 8/2012 | Fouillade et al. | |

* cited by examiner

SELF-BALANCING ROBOT HAVING A SHAFT-MOUNTED HEAD

CROSS-REFERENCE TO RELATED APPLICATIONS

This application is a Continuation-in-Part of U.S. patent application Ser. No. 12/781,702 filed on May 17, 2010 and also entitled "Self-Balancing Robot having a Shaft-Mounted Head" which is related to U.S. patent application Ser. No. 12/242,532 filed on Sep. 30, 2008 and entitled "Self-Balancing Robot including Flexible Waist," which is incorporated herein by reference.

BACKGROUND OF THE INVENTION

1. Field of the Invention

The present invention relates generally to the field of robotics and more particularly to mobile self-balancing robots.

2. Related Art

Telepresence refers to the remote operation of a robotic system through the use of a human interface. Telepresence allows an operator of the robotic system to perceive aspects of the environment in which the robotic system is located, without having to physically be in that environment. Telepresence has been used, for example, by doctors to perform medical operations without being present in the operating room with the patient, or by military personnel to inspect a bomb.

Robotic systems that provide telepresence capabilities are either fixed in a particular location, or provide a degree of mobility. Of those that provide mobility, however, the forms tend to be close to the ground and built on wide, heavy, platforms with three or more legs or wheels for stability. These systems, in short, lack a generally upright human form, and accordingly, an operator cannot perceive and/or navigate the remote environment from a natural upright perspective with the normal range of motion and mobility one would have if actually present in the remote environment.

SUMMARY

An exemplary robot of the present invention comprises a base supported on wheels, a head joined to the base by a shaft extending therebetween, and a control system configured to maintain balance of the robotic system on the wheels. The shaft can comprise carbon fiber or fiberglass, for example. In various embodiments, the base includes a retractable tail. The tail is retracted for normal operation, but can be extended to form a tripod with the wheels on which the robot can rest stably. In some instances, the tail comprises a lead screw. In various embodiments the robot weighs no more than 30 pounds.

Various embodiments of the robot comprise one or more of a forward-facing camera aimed essentially perpendicular to a longitudinal axis of the shaft, a down camera aimed towards the ground in front of the robot, a remotely controllable laser pointer, a microphone, and a display screen. The head can also comprise impact protection such as eleastomeric mountings and a circumferential bumper. In some embodiments, the forward-facing camera and the laser pointer arranged side-by-side to resemble eyes.

Various embodiments of the robot comprise a telescoping shaft, and in some of these embodiments the shaft includes a helical coiled cord comprising communications and/or power lines. In some instances a width of the shaft is between about 1 inch and 4 inches. In some of the embodiments in which the shaft is extendable, the robot stands no more than 6 feet tall when the shaft is fully extended and stands about 2 feet tall when the shaft is fully retracted.

Another exemplary robot of the present invention comprises a base, supported on wheels, a control system configured to maintain balance of the robot on the wheels and a head joined to the base by a shaft extending therebetween. The base of the exemplary robot also includes a retractable tail that retracts into the base and that, when extended, can form a tripod with the wheels on which the robot can stably rest, the tail being pivotally attached to the base. In still another exemplary robot, the base includes a retractable stabilizer that can retract into the base, where the robot can stably rest on the wheels and the stabilizer when the stabilizer is extended. In various embodiments the stabilizer comprises a linear actuator or is pivotally attached to the base. In some of the latter embodiments the control system is further configured to autonomously extend the stabilizer in response to a wind strength exceeding a threshold.

Additional exemplary methods of the invention comprises transitioning a robot from a non-balancing state to a balancing state or from a balancing state to a non-balancing state. In these embodiments, the robot including a base having two wheels and a retractable stabilizer, the two wheels defining a common axis of rotation, the non-balancing state is characterized by the base being supported on the two wheels and the stabilizer, while the balancing state characterized by the base being supported on only the two wheels. Transitioning the robot from the balancing state to the non-balancing state includes measuring a wind strength and extending the stabilizer.

In various methods directed to transitioning a robot from a non-balancing state to a balancing state, where the retractable stabilizer comprises a linear actuator, the linear actuator is extended by a first length when in the non-balancing state. During the transition to the balancing state, the stabilizer is used to rotate the base around the axis of rotation to push the robot up towards the point where the center of gravity is over an axis of rotation defined between the two wheels. The stabilizer achieves this by first extending further beyond the first length, and once the robot is able to balance can then retract into the base. In those embodiments where the retractable stabilizer is pivotally attached to the base at a pivot point, the stabilizer is used to rotate the base around the axis of rotation by rotating the stabilizer around the pivot point.

DETAILED DESCRIPTION OF THE INVENTION

The present invention is directed to mobile self-balancing robots characterized by a generally human-like upright posture, and robotic systems that include such robots in combination with other components, such as remote operating systems for providing telepresence. The robots of the present invention are human-like in that they are mobile, include a "head" and a generally upright posture with the head positioned at the top, and include a balancing control system for maintaining the upright posture. The human-like nature of the robots can also include a general resemblance of the head to a human head in terms of size, shape, placement of components to resemble eyes, and so forth. The human-like nature of the robots can further include a height of the robot when balancing that is within the range of normal adult heights.

More specifically, the robot of the present invention comprises three basic components, a base for providing mobility and maintaining balance, a head principally for providing telepresence capabilities, and a shaft joining the head to the base to keep the head elevated over the base. In operation, the base can propel the robot while self-balancing on the wheels, and when operation is complete the base can transition to a resting configuration. The shaft can be telescoping so that the height of the head can be adjusted within a certain range, and so that the robot can be collapsed to a compact configuration for storage and transportation. The head includes features to provide impact resiliency so that the head is able to withstand collisions, including striking the floor in a fall.

The mobility and upright posture make the robots of the present invention suitable for telepresence and other applications. For example, a person can control a robot remotely using a user interface to navigate the robot and can use cameras and a microphone in the head to receive video and audio from the perspective of a person of normal height. Robots of the invention can also include components that allow the person to communicate through the robot, such as a speaker, a video display screen, and/or a laser pointer. Robotic systems of the present invention can be particularly useful for the mobility impaired, for those not wishing to travel, people seeking to hide their appearance or identity, and so forth.

Figures 1, 2:
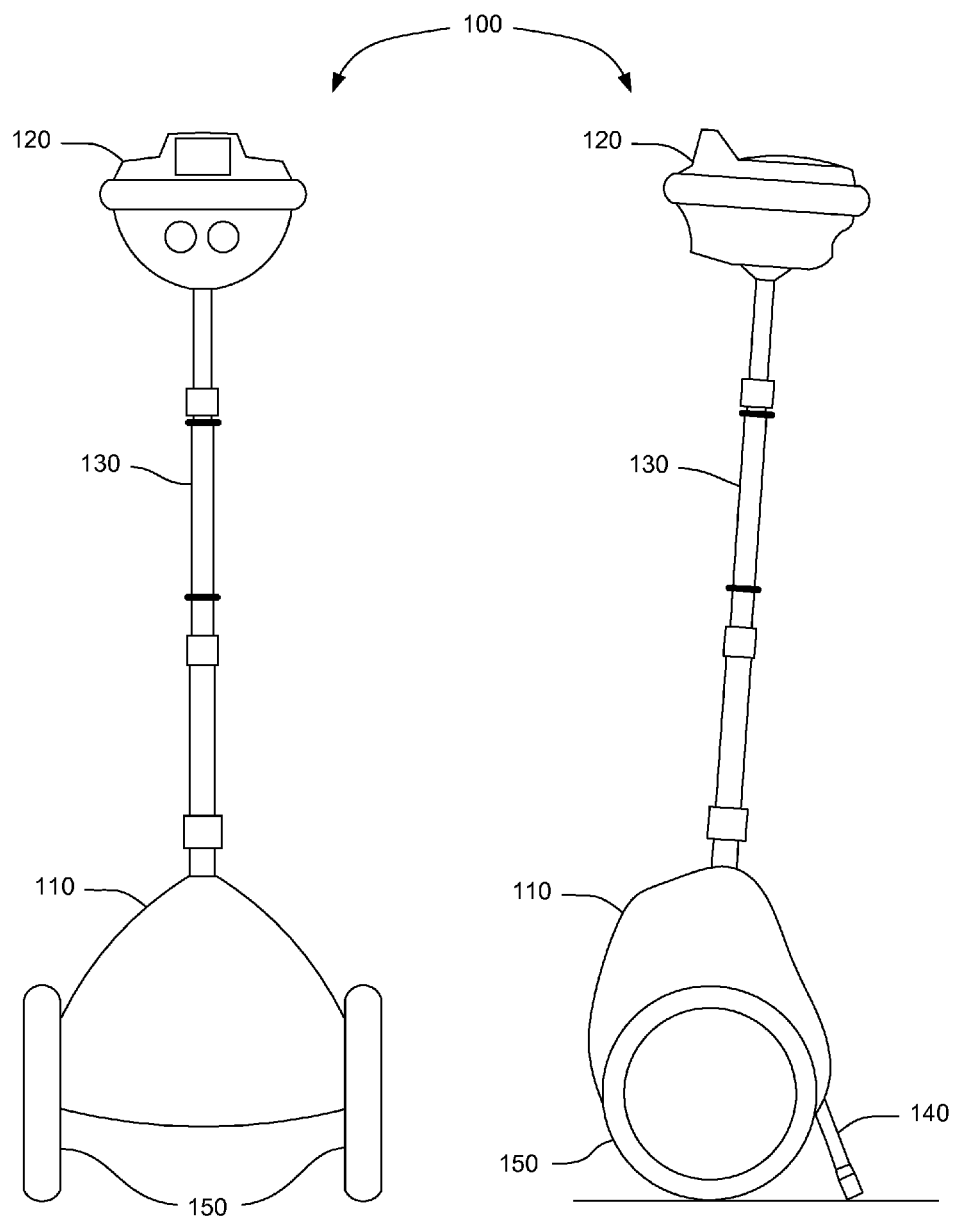
FIG. 1 shows a front view of a robot having a shaft-mounted head according to an exemplary embodiment of the invention.
FIG. 2 shows a side view of a robot having a shaft-mounted head according to another exemplary embodiment of the invention.

FIGS. 1 and 2 show front and side views, respectively, of an exemplary robot 100 of the present invention. The robot 100 comprises a base 110, a head 120, and a shaft 130. As can be seen from FIGS. 1 and 2, the head 120 has an anthropomorphic form, having a general resemblance to a human head. Overall, the robot 100 also has an anthropomorphic form, having a general resemblance to a human with an upright posture and a head on top, as well as an ability to move and maintain balance. In some embodiments, the weight of the robot is no more than 30 pounds.

The base 110 optionally includes a tail 140, seen in FIG. 2, which is retractable into the base 110, in some embodiments. FIG. 1 does not show the tail 140, illustrating both those embodiments in which the tail 140 is retractable, as well as those embodiments that omit the tail 140.

The base 110 also includes two wheels 150, disposed on opposite sides of the base 110. The wheels 150 can comprise aluminum or plastic, for example. In various embodiments the wheels 150 include tires that are formed of non-marking rubber. The base 110 is configured to be able to balance in place on the wheels 150, to move the robot 100 to different locations while balancing on the wheels 150, as well as enter a resting state in which the robot 100 is no longer self-balancing. An exemplary resting state is the one shown in FIG. 2 where the wheels 150 and tail 140 comprise a tripod on which the robot 100 can rest. In some embodiments, the base 120 is no more than 28 inches wide and 16 inches long, where the width is the distance between the wheels 150 in FIG. 1 and the length is measured parallel to the ground and perpendicular to the width when the robot 100 is balancing.

The shaft 130 joins the head 120 to the base 110. Suitable materials for the shaft 130 include carbon fiber composites and fiberglass. These materials provide good stiffness, light weight, and fail catastrophically rather than plastically. Other suitable materials include metals such as aluminum alloys, and plastics. In some embodiments, the shaft 130 is configured to be telescoping, as illustrated in FIGS. 1 and 2 (see also FIG. 8 for the fully retracted configuration).

Figure 3:
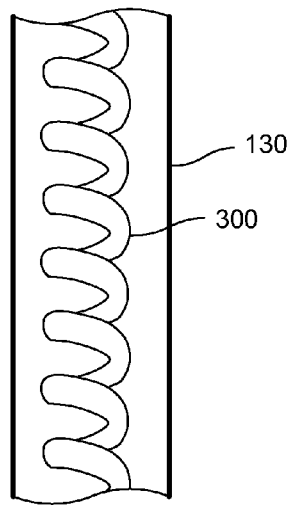
FIG. 3 shows a cross-sectional view of a shaft according to an exemplary embodiment of the invention.

FIG. 3 shows a cross-sectional view through a portion of an exemplary shaft 130. Within the shaft 130, the shaft 130 can include power and communication lines. One or more power lines permit electrical power transmission between the base 110 and the head 120, while one or more communications lines permit data to be transmitted between the base 110 and the head 120. Optionally, communication between the head 120 and the base 110 can be achieved wirelessly, such as by using Bluetooth technology. In some embodiments, the various lines within the shaft 130 are bundled together with a common cord 300, and in some of these embodiments the cord 300 is characterized by having a helical coil shape, as illustrated in FIG. 3. It will be appreciated that such a coiled cord 300 can stretch and contract in response to changes in the length of the shaft 130.

In some embodiments, the shaft 130 is telescoping, and in some of these embodiments the height of the robot 100 is no more than 6 feet when the shaft 130 is fully extended, where the height is measured from the ground to the top of the head 120 when the robot 100 is balanced on the wheels 150. Also, in some embodiments, the height of the robot 100 is about two feet when the shaft 130 is fully retracted (see FIG. 8). In various embodiments, the shaft 130 has a maximum width of about 4 inches. In other embodiments, the shaft 130 has a minimum width of about 1 inch. One advantage of the shaft 130 is that it provides the robot 100 with a narrow cross-section between the head 120 and base 110, making it less likely that the robot 100 will strike protruding table edges, railings, and the like.

Figure 4:
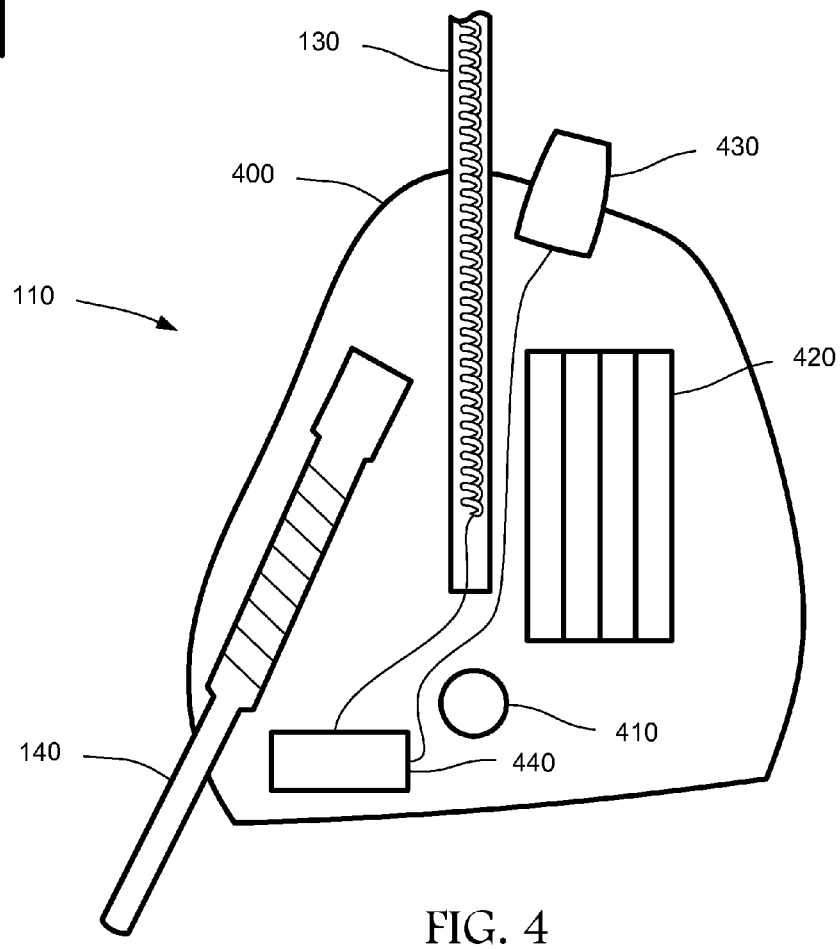
FIG. 4 shows a cross-sectional view of a base according to an exemplary embodiment of the invention.

FIG. 4 shows a cross-sectional view through an exemplary embodiment of the base 110. The base 110 comprises a housing 400 including, for example, an internal layer of aluminum or steel sheet metal to which the components within the base 110 are mounted. In some embodiments, the housing 400 additionally includes an exterior cladding, such as of molded plastic, enclosing the internal layer. The shaft 130 extends through the housing 400 and is mounted within the base 110. Likewise, the tail 140 also extends through the housing 400. A motor (not shown) within the base 110 is configured to extend and retract the tail 140. In some embodiments the tail 140 comprises a linear actuator such as a lead screw.

The base 110 includes an axle 410 that also extends through the housing 400 and to which the wheels 150 are attached. The base 110 also includes one or more motors (not shown) configured to rotate the axle 410 to turn the wheels 150. The base 110 further includes one or more batteries 420 to power the motor and the electronics of the robot 100. Some embodiments of the robot 100 optionally include a Light Detection and Ranging (LIDAR) system 430 in the base 110 for determining the distances to objects for collision avoidance.

The robot 100 also includes electronic systems, denoted generally as electronics 440, to maintain balance, control movement, avoid collisions, and optionally to provide services such as telepresence, for example. Electronics 440 can comprise, for instance, a microprocessor in communication with a memory device storing instructions that can direct the microprocessor to perform these services. Alternatively, some or all of these services can be provided by electronics 440 that comprises firmware. The electronics 440 may be disposed within the base 110, the head 120, or distributed across both.

Electronics 440 can additionally comprise external communications interfaces to connect to one or more networks such as cellular networks, Bluetooth networks, and wireless networks like WiFi networks to provide connectivity between the robot 110 and a remote operator. The electronics 440 can also provide internal communications interfaces to provide connectivity between the external communications interfaces and communication devices like the speaker 550, microphone 560, video screen 540, and laser pointer 530 (see FIG. 5). In some embodiments, the electronics 440 includes various sensory electronics, for example, the LIDAR system 430, a balance sensor for maintaining balance, and a position sensor such as GPS system to spatially locate the robot 100. The electronics 440 is also in communication with, and controls, the motor and the tail 140. The electronics 440 can also comprise internal systems for monitoring battery life, taking autonomous emergency actions, and so forth. The electronics 440 can also further comprise an ultracapacitor system that can provide emergency power sufficient to bring the robot 100 to a stop and then to a rest configuration, such as balanced on a tripod formed by the wheels 150 and tail 140, if communication with the remote operator is dropped, or the batteries 420 are depleted or disconnected.

Suitable systems and methods for maintaining balance, controlling movement, providing communications and telepresence, collision avoidance, and the like are generally well known in the art. Some examples of electronics 440, including control systems for maintaining balance of self-balancing robots 100, are also provided in U.S. patent application Ser. No. 12/242,532, noted above, and additionally U.S. patent application Ser. No. 12/255,816 filed on Oct. 22, 2008 and entitled "Self-Balancing Robot including an Ultracapacitor Power Source," U.S. patent application Ser. No. 12/258,268 filed on Oct. 24, 2008 and entitled "Remotely Controlled Self-Balancing Robot Including Kinematic Image Stabilization," U.S. patent application Ser. No. 12/277,872 filed on Nov. 25, 2008 and entitled "Remotely Controlled Self-Balancing Robot including a Stabilized Laser Pointer," and U.S. patent application Ser. No. 12/350,063 filed on Jan. 7, 2009 and entitled "Robot Including Electrically Activated Joints," each of which are incorporated herein by reference.

Figure 5:
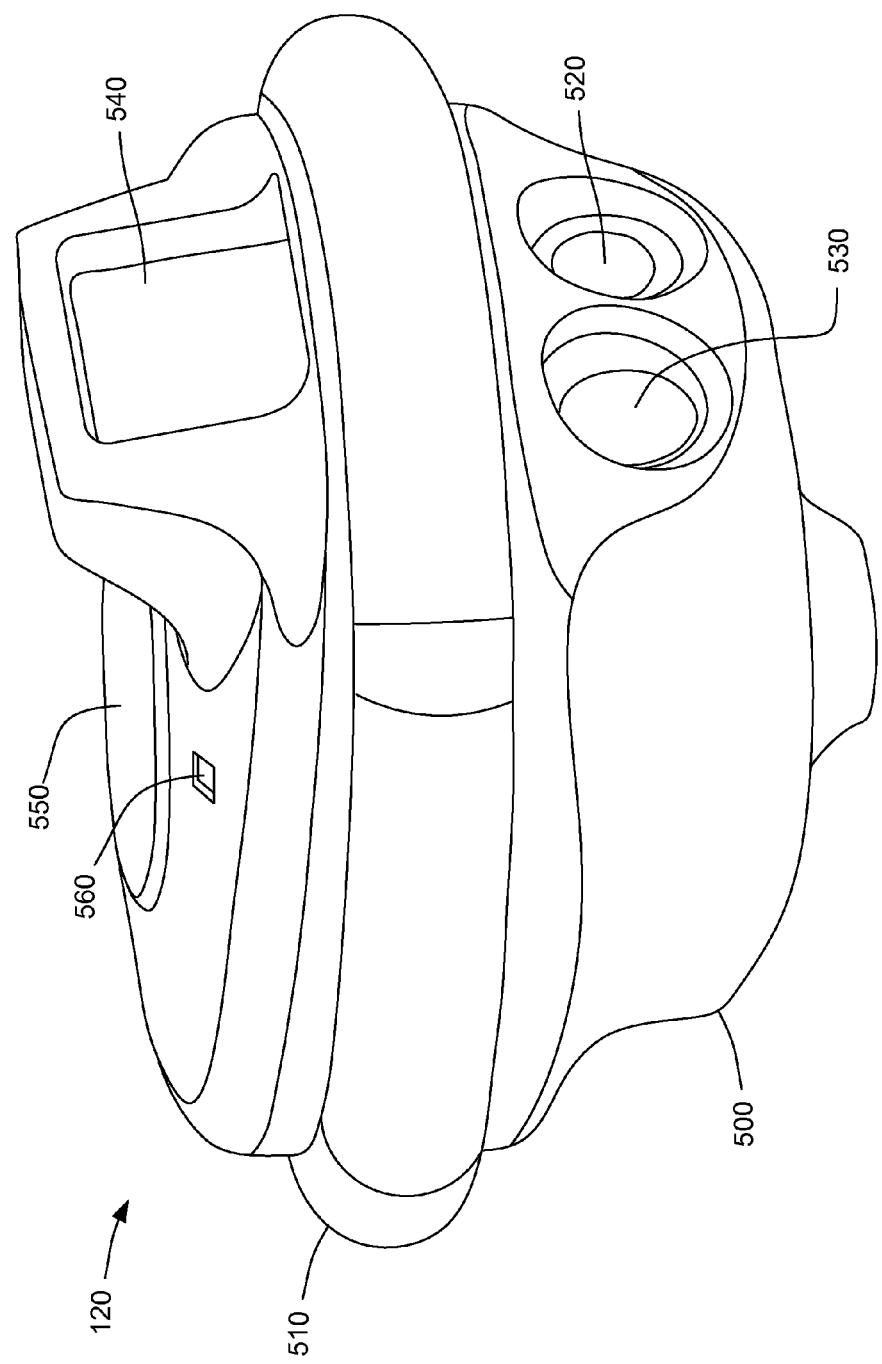
FIG. 5 shows a perspective view of a robot head according to an exemplary embodiment of the invention.

FIG. 5 shows a perspective view of an exemplary embodiment of the head 120. The head 120 comprises a housing 500 including, for example, an internal layer of aluminum or steel sheet metal to which the components within the head 120 can be mounted. In some embodiments, the housing 500 includes an exterior cladding, for instance made of molded plastic, enclosing the internal layer. The head 120 additionally comprises a circumferential bumper 510, discussed further below with respect to FIG. 7, and optionally any or all of a camera 520, a laser pointer 530, a display screen 540, a speaker 550, and a microphone 560. The microphone 560 can be a noise-cancelling microphone, in some instances.

The camera 520 can be used to provide video to a remote operator from the perspective of a standing human of generally normal height. Likewise, the microphone 560 can provide audio to the remote operator from the same perspective. Some embodiments of the robot 100 include, in addition to the camera 520, a down camera (see FIG. 6). In various embodiments the head 120 also optionally includes an illumination source and/or signal lights (not shown). The laser pointer 530 can be controlled by the remote operator through the electronics 440 to allow the robot 100 to gesture, such as by pointing to objects within the field of view of the camera 520. Still images and video content can be displayed on the display screen 540 by the electronics 440 while audio content can be provided through the speaker 550. Such content can be provided by the remote operator through electronics 440.

Figure 6:
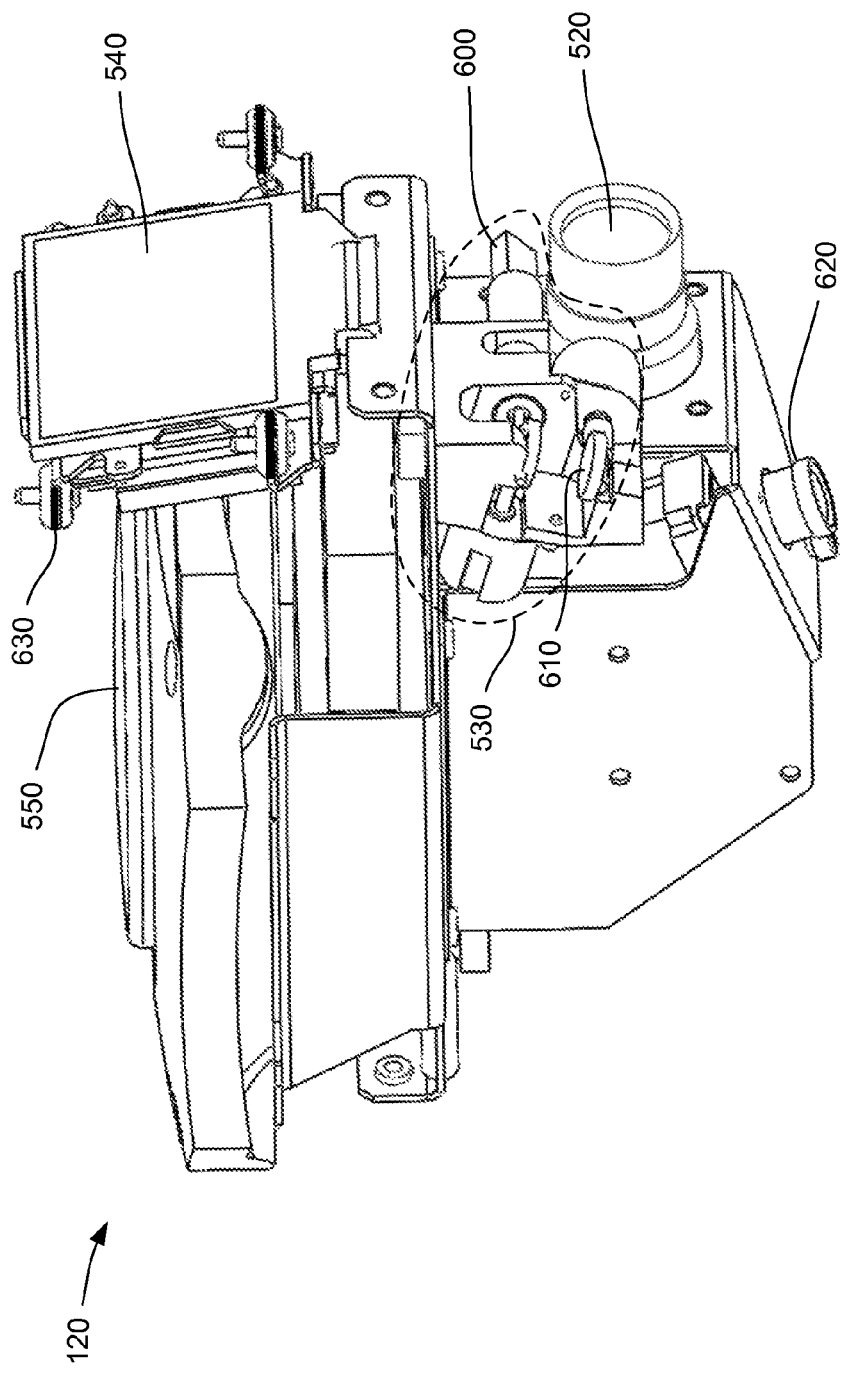
FIG. 6 shows a perspective view of the components within the robot head of FIG. 5, according to an exemplary embodiment of the invention.

FIG. 6 shows a perspective view of the components within an exemplary embodiment of the head 120. Essentially, FIG. 6 shows the embodiment of FIG. 5 without the housing 500. The laser pointer 530 includes a laser 600 and optics 610 configured to direct the laser beam from the laser 600 through a lens in the housing 500. Exemplary laser pointers 530 are described in more detail in U.S. patent application Ser. No. 12/277,872. Also shown in FIG. 6, though not visible in FIG. 5, is a down camera 620. The down camera 620 is aimed so as to provide a view of the ground in front of the base 110 so that an operator can avoid low obstacles in the path of the robot 100. A field of view of the down camera 620, in some embodiments, includes both a region in front of the robot 100 and a region behind the robot 100. The view behind can be useful, for example, when backing the robot 100 such as when manually docking the robot 100 with a docking station for recharging. In various embodiments, the display screen 540 is mounted within the head 120 using elastomeric mounts 630. The elastomeric mounts 630 provide shock resistance to the video screen 540.

Figure 7:
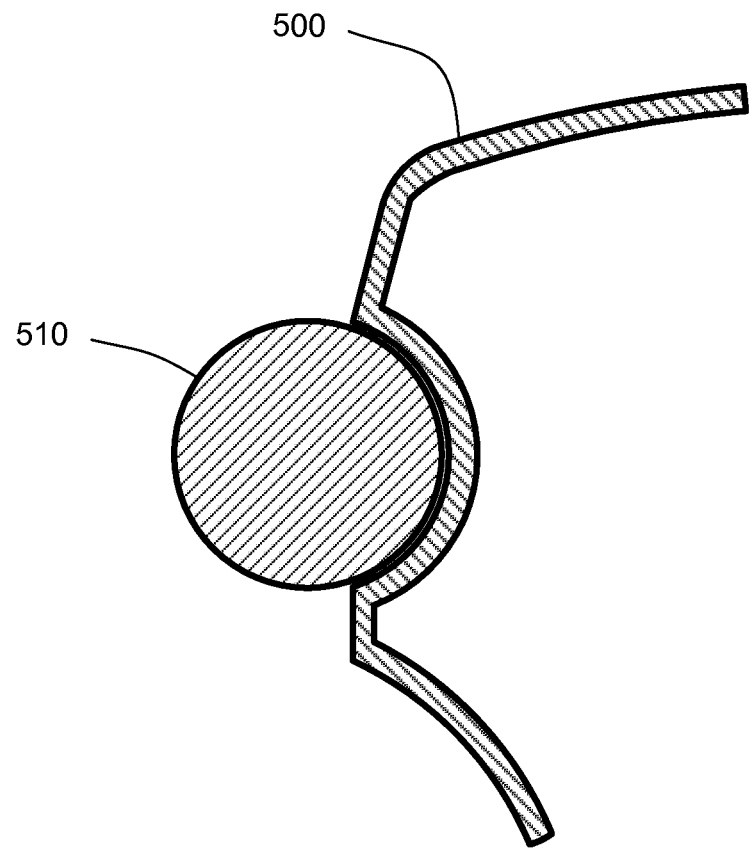
FIG. 7 shows a cross-sectional view of a portion of a housing for a robot head, including a bumper, according to an exemplary embodiment of the invention.

The robot 100 of the present invention can comprise various components that provide impact protection against bumps and falls. Examples include elastomeric mounts 630 and the bumper 510. FIG. 7 shows a cross-sectional view of a portion of the housing 500 that includes the bumper 510. In some embodiments, the bumper 510 is disposed within a recess in the housing 500. The bumper 510 helps the robot 500 withstand collisions and falls. Suitable materials for the bumper 510 include rubber, silicone or polyurethane foam. The bumper 510, in some embodiments, comprises a continuous ring around the head 510 that may be, for example, about 12 inches in diameter and about 1.5 inches thick.

Figure 8:
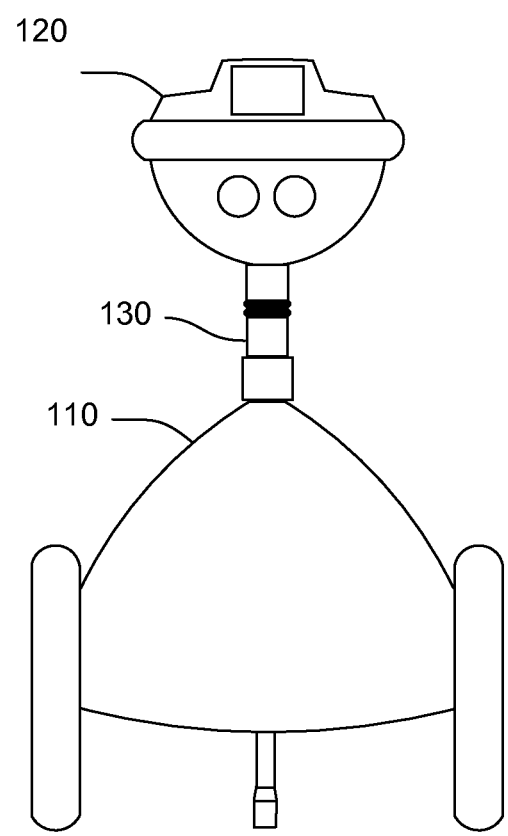
FIG. 8 shows a front view of the robot of FIG. 1 with the head lowered, according to an exemplary embodiment of the invention.

FIG. 8 shows a front view of the robot 100 of FIG. 1 with the head 120 retracted by collapsing the telescoping shaft 130. This compact configuration provides for easier storage and transportation.

Figure 10:
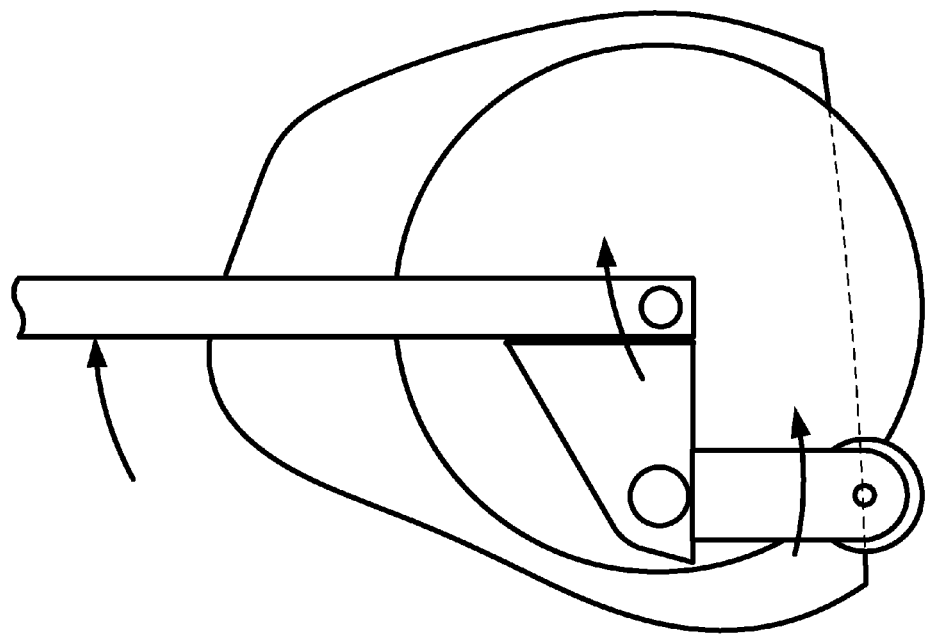
FIGS. 9-11 provide a cross-sectional view of a base, according to another exemplary embodiment of the invention, where a retractable stabilizer thereof is shown in three different positions.
Figure 9:
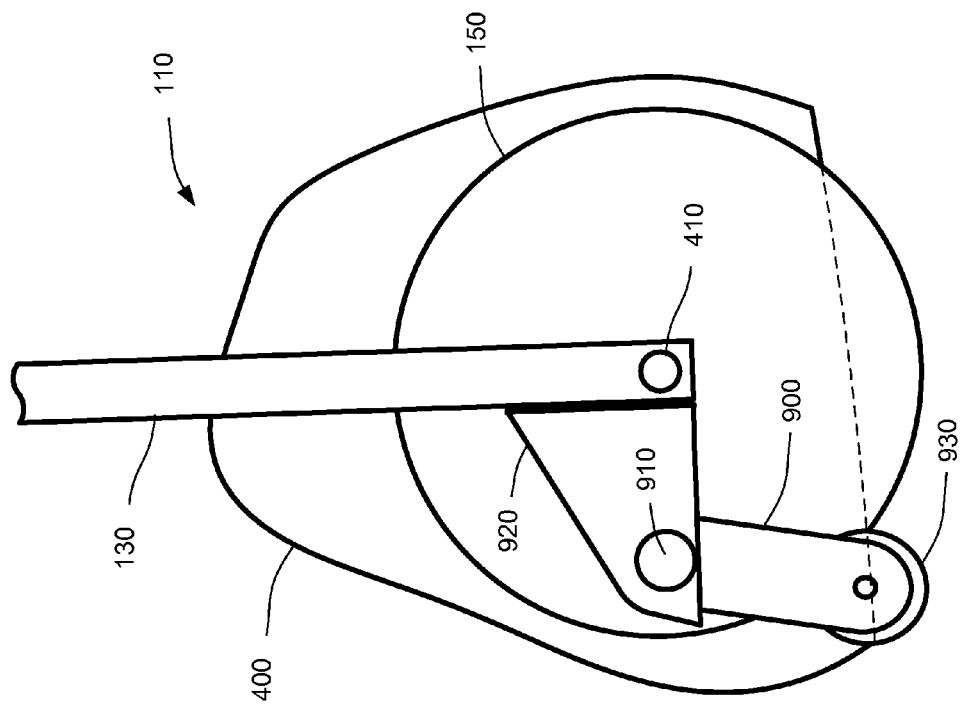
Figure 11:
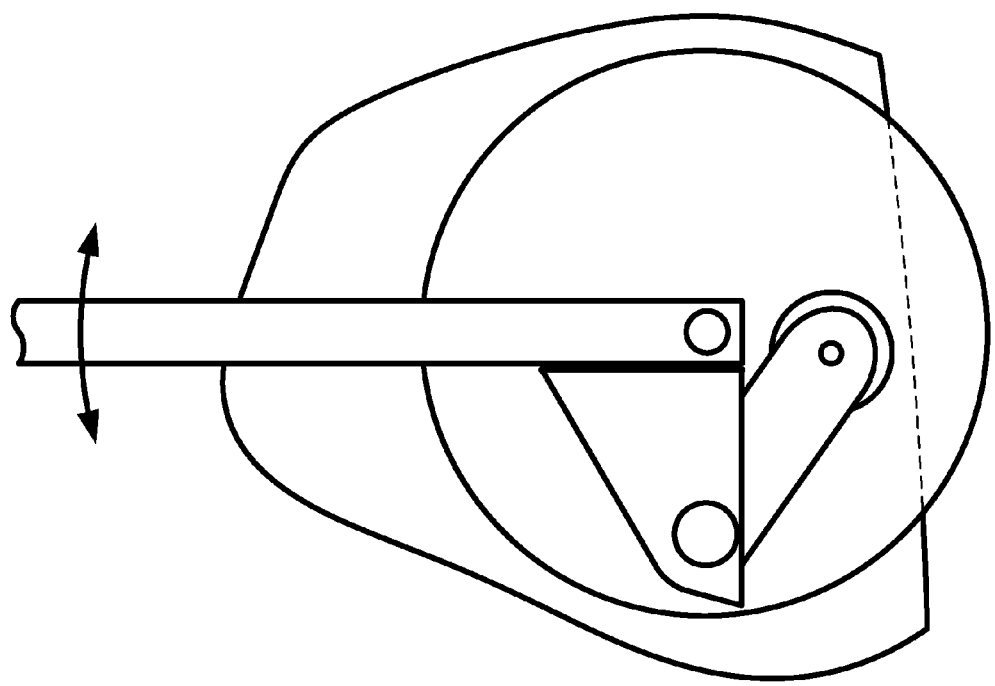

FIGS. 9-11 show a cross-sectional view of a base 110 according to another exemplary embodiment of the invention. The drawings show a housing 400 of the base 110, an axle 410 that extends through the base 110, shaft 130, one of two wheels 150 joined to the axle 410, and a tail or stabilizer 900. The stabilizer 900 is pivotally connected to the base 110, and in the illustrated embodiment the point of connection, a pivot point 910, is cantilevered out from the axle 410 as shown. In the illustrated embodiment, the pivot point 910 attaches the stabilizer 900 to a distal end of a support member 920 having a proximate end fixed to the base 110 near the axle 410.

Together, the support member 920 and the stabilizer 900 comprise two pivotally joined levers with one end fixedly attached to the base 110.

The stabilizer 900 can be rotated around the pivot point 910 by an actuator (not shown), such as a servo motor. The stabilizer 900, in some embodiments, includes a wheel 930 at the distal end to contact the ground. The wheel 930 can constitute a third wheel so that in certain circumstances the robot can move about while supported on three wheels rather than balancing on just the two primary wheels 150.

FIGS. 9-11 show three different positions for the stabilizer 900 corresponding to three different robot postures. The robot posture of FIG. 9 represents a non-balancing state of the robot. In this non-balancing state the stabilizer 900 is extended and the robot rests on a tripod formed by the stabilizer 900 and the wheels 150, a center of gravity of the robot being positioned between the distal end of the stabilizer 900 and the axle 410. The robot can be stationary or driven while in the-balancing state.

The robot posture of FIG. 10 represents a transition to a balancing state of the robot. The robot can be translated to the balancing state by rotating the stabilizer 900 around the pivot point 910 to a vertical orientation, effectively pushing the robot up into the balancing state by rotating the base 110 around an axis of rotation defined by the axle 410. As the stabilizer 900 reaches the vertical orientation, rotational inertia will cause the robot to continue to pitch forward, at which point the dynamic balancing control can maintain the balance and the stabilizer 900 can be further rotated around the pivot point 910 to retract the stabilizer 900 into the base 110 as shown in FIG. 11.

In those embodiments where the stabilizer 900 comprises a linear actuator as shown in FIG. 4, in non-balancing state the linear actuator is extended by a first length to support the robot in a posture analogous to that shown in FIG. 9. To transition to the balancing state, the linear actuator extends further, to a second length, rotating the base 110 around the axle 410 analogous to the manner illustrated in FIG. 10, until the balancing state is reached at which point the linear actuator can fully retract.

In some embodiments, the electronics 440 (FIG. 4) includes logic configured to respond to wind by extending the stabilizer 900. Wind is an example of an external force that can affect the balance of the robot. Another example is a push from a person. While both external forces require a response to keep the robot balanced, wind can be differentiated by its duration and variability. One indication of wind is that the robot pitches forward and back more than in the absence of wind, while another indication is that the wheels are being driven by the balancing electronics even though no commands are being received to move the robot. In some embodiments in which the electronics 440 includes logic to respond to wind, the logic is configured to measure the strength of the wind and if the measured wind strength exceeds a threshold, then the electronics 440 can autonomously deploy the stabilizer 900 so that the robot rides on three wheels rather than balancing on the two wheels 150. The strength of the wind can be determined by the average lean of the robot relative to the vertical when the robot is balancing in a fixed location, for example. It should be noted that the measured wind strength need not be a wind speed measurement but can be a measure that scales with wind speed, like an average angle of lean as measured by a balance sensor.

Figure 12:
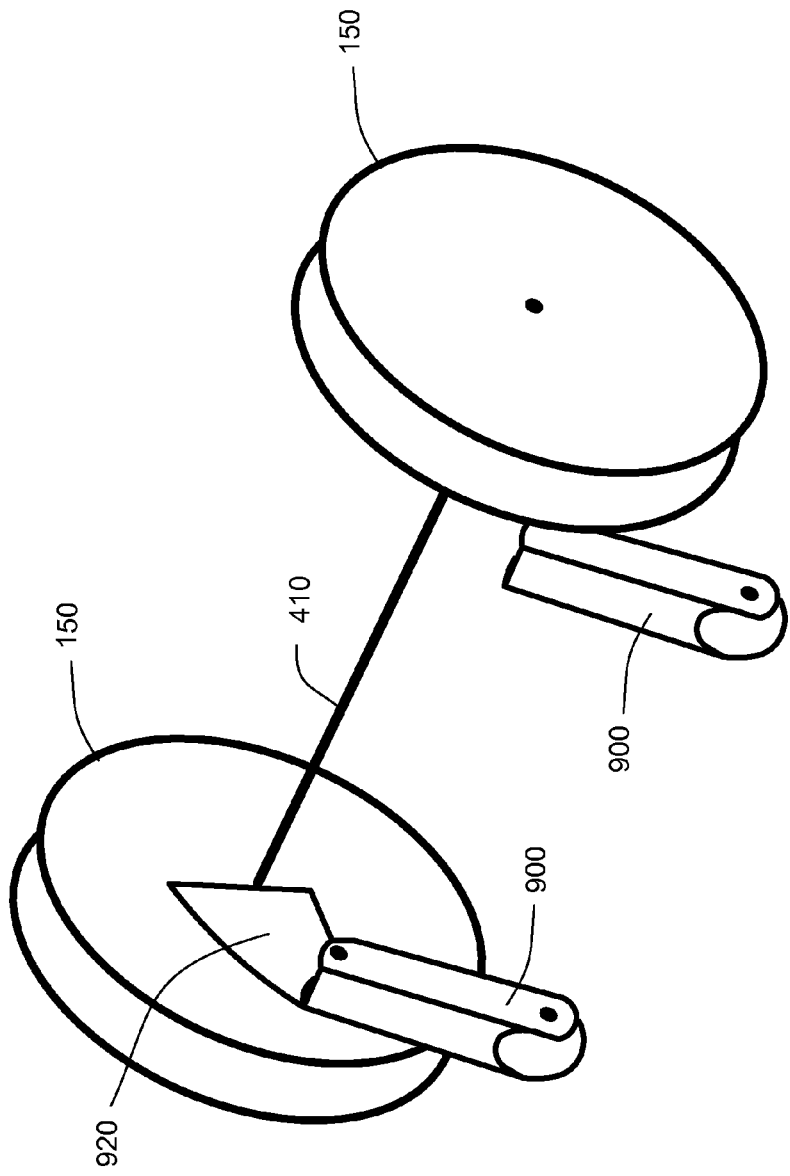
FIG. 12 provides a perspective view of components of a base having two stabilizers, according to another exemplary embodiment of the invention.

The stabilizer can be deployed while moving on ramps, as still another example. It should also be apparent that the stabilizer 900 can be deployed when the robot will no longer be in use, or when there is a deleterious power disruption, in addition to in response to wind. Deploying the stabilizer 900 can comprise extending the stabilizer 900 to reach the ground, or in some instances short of the ground, at which point the robot will stop balancing and pitch backwards until the stabilizer contacts the ground. FIG. 12 shows a perspective view of select components of an exemplary embodiment of a base 110. Here, only the wheels 150 and axle 410, and two stabilizers 900, are illustrated. One stabilizer 900 is just to the inside of each wheel 150 and the stabilizers 900 can be actuated in tandem.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A robot comprising:
    a base, supported on wheels, and including a retractable tail that retracts into the base and that, when extended, can form a tripod with the wheels on which the robot can stably rest, the tail being pivotally attached to the base;
    a control system configured to maintain balance of the robot on the wheels; and
    a head joined to the base by a shaft extending therebetween.

2. The robot of claim 1 wherein the tail comprises a third wheel at a distal end thereof.

3. The robot of claim 1 wherein the wheels are joined by an axle extending through the base and wherein the tail is pivotally attached to the base at a pivot point cantilevered from the axle.

4. The robot of claim 1 further comprising logic configured to extend the tail in response to wind.

5. The robot of claim 1 wherein the head includes a forward-facing camera.

6. The robot of claim 5 wherein the head further includes a down camera.

7. The robot of claim 1 wherein the head includes impact protection.

8. A robot comprising:
    a base supported on wheels and including a retractable stabilizer that can retract into the base, where the robot can stably rest on the wheels and the stabilizer when the stabilizer is extended;
    a control system configured to maintain balance of the robot on the wheels; and
    a head joined to the base by a shaft extending therebetween, the head including a camera.

9. The robot of claim 8 wherein the stabilizer comprises a linear actuator.

10. The robot of claim 8 wherein the stabilizer is pivotally attached to the base.

11. The robot of claim 10 wherein the control system is further configured to autonomously extend the stabilizer in response to a wind strength exceeding a threshold.

12. The robot of claim 8 wherein the base further includes a second retractable stabilizer that can retract into the base, where the robot can stably rest on the wheels and both stabilizers when the stabilizers are extended.

13. A method comprising:
    transitioning a robot from a non-balancing state to a balancing state,
    the robot including a base having two wheels and a retractable stabilizer, the two wheels defining a common axis of rotation;
    the non-balancing state characterized by the base being supported on the two wheels and the stabilizer,
    the balancing state characterized by the base being supported on only the two wheels, and
    wherein transitioning the robot from the non-balancing state to the balancing state includes using the stabilizer to rotate the base around the axis of rotation.

14. The method of claim 13 wherein the retractable stabilizer comprises a linear actuator, wherein the linear actuator is extended by a first length when in the non-balancing state, and wherein using the stabilizer to rotate the base around the axis of rotation includes extending the linear actuator further beyond the first length.

15. The method of claim 13 wherein the retractable stabilizer is pivotally attached to the base at a pivot point and wherein using the stabilizer to rotate the base around the axis of rotation includes rotating the stabilizer around the pivot point.

16. A method comprising:
    transitioning a robot from a balancing state to a non-balancing state,
    the robot including a base having two wheels and a retractable stabilizer, the two wheels defining a common axis of rotation;
    the non-balancing state characterized by the base being supported on the two wheels and the stabilizer,
    the balancing state characterized by the base being supported on only the two wheels, and
    wherein transitioning the robot from the balancing state to the non-balancing state includes measuring a wind strength and extending the stabilizer.

* * * * *